United States Patent
Tseng et al.

(10) Patent No.: US 8,726,411 B1
(45) Date of Patent: May 13, 2014

(54) CHARGED PROBE AND ELECTRIC FIELDS MEASUREMENT METHOD THEREOF

(71) Applicant: National Tsing Hua University, Hsinchu (TW)

(72) Inventors: Fan-Gang Tseng, New Taipei (TW); Joe-Ming Chang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/920,797

(22) Filed: Jun. 18, 2013

(30) Foreign Application Priority Data

Mar. 21, 2013 (TW) ............................. 102109996 U

(51) Int. Cl.
*G01Q 70/12* (2010.01)
*G01Q 20/02* (2010.01)
*G01B 7/34* (2006.01)
*G01B 5/28* (2006.01)
*H01L 21/306* (2006.01)
*G01K 13/00* (2006.01)

(52) U.S. Cl.
USPC .................. 850/58; 850/5; 850/33; 977/849; 977/863; 977/876; 73/105; 374/120

(58) Field of Classification Search
USPC ......... 850/5, 6, 21, 23, 29, 32, 33, 38, 40, 52, 850/57, 58, 59; 977/849, 854, 860, 863, 977/876, 878, 879; 250/306, 307; 73/104, 73/105; 374/120, 124, 141, 142
See application file for complete search history.

(56) References Cited

U.S. PATENT DOCUMENTS

| | | | | |
|---|---|---|---|---|
| 5,026,437 A | * | 6/1991 | Neukermans et al. | 148/33.3 |
| 5,969,238 A | * | 10/1999 | Fischer | 73/105 |
| 6,066,265 A | * | 5/2000 | Galvin et al. | 216/2 |
| 6,810,720 B2 | * | 11/2004 | Adderton et al. | 73/105 |
| 6,816,806 B2 | * | 11/2004 | Kocimski | 702/167 |
| 2002/0183963 A1 | * | 12/2002 | Kocimski | 702/167 |
| 2010/0275335 A1 | * | 10/2010 | Tseng et al. | 850/59 |
| 2011/0182805 A1 | * | 7/2011 | DeSimone et al. | 424/1.11 |
| 2013/0276174 A1 | * | 10/2013 | Li et al. | 850/6 |
| 2014/0020140 A1 | * | 1/2014 | Tseng et al. | 850/33 |

* cited by examiner

*Primary Examiner* — Bernard E Souw
(74) *Attorney, Agent, or Firm* — Muncy, Geissler, Olds & Lowe, P.C.

(57) ABSTRACT

A charged probe and an electric field measuring method are provided. The probe can be charged with single electricity on single nano particle attached on the top of the probe tip being a charged probe and the probe is applicable for measuring the electric fields of object in the nano scale. The probe comprises an insulating tip base, a cantilever and a single nano-particle. The cantilever is arranged for supporting the insulating tip base and the single nano-particle is configured on the erosion plane. After conducting contact electrification method to charge the electric nano particle, the single nano-particle will be charged with fixed number of single electrical charge. Then, the amount of the fixed number of single electrical charge is calculated by the virtual image charge calculation method. The charged probe can be used to measure the electric fields distribution by tapping mode or f-d curve measurement.

10 Claims, 8 Drawing Sheets

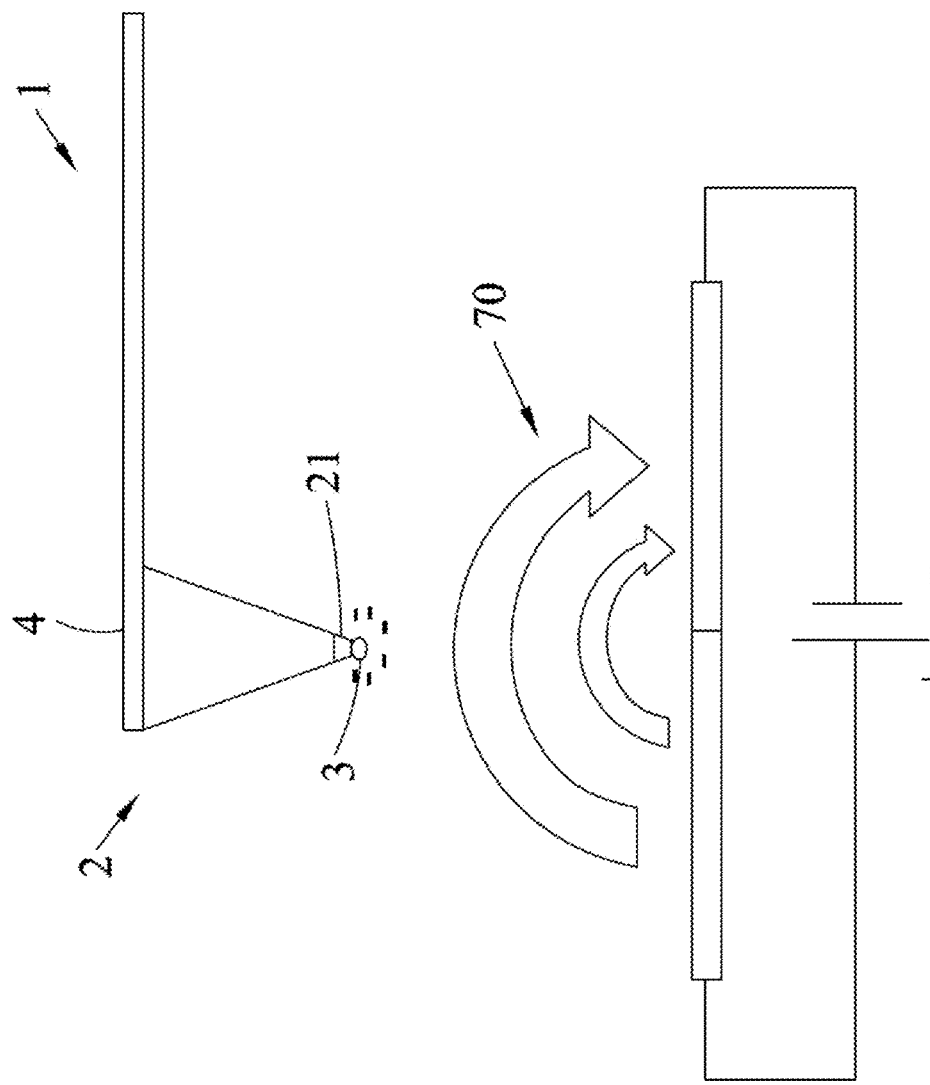

CHARGED PROBE AND ELECTRIC FIELDS MEASUREMENT METHOD THEREOF

CROSS-REFERENCE TO RELATED APPLICATION

This application claims the benefit of Taiwan Patent Application No. 102109996, filed on Mar. 21, 2013, in the Taiwan Intellectual Property Office, the disclosure of which is incorporated herein in its entirety by reference.

BACKGROUND OF THE INVENTION

1. Field of the Invention

The invention relates to a probe and its application in electrical measurement field, and more particularly to a charged probe capable of allowing a tip of a probe storing a fixed amount of charge having only single electric property and the electric field measurement method thereof.

2. Description of the Related Art

Currently, the electric field distribution of electrical components scanned and observed by scanning probe microscopy is a widespread and mature technique that is used for detecting the in-process quality of electrical components in semiconductor industry. Its electric property, such as charge distribution, potential distribution and capacitance characteristic, may be obtained by electrostatic force microscope (EFM), Kelvin probe force microscope (KFM) and capacitance force microscope (CFM). However, while measuring electric property by using conventional SPM, due to complicated operating procedure, a conducted probe firstly scans the appearance of the measured object. After raising the probe to a fixed height and applying an additional bias on the probe and a test workpiece, the probe is vibrated to scan the object along the surface of the object in suspension condition. The probe amplitude and phase change caused by capacitance electrostatic force of the conducted probe and measurement test workpiece are recorded thereby the electric properties such as charge distribution, potential distribution and capacitance characteristic of the electrical component could be obtained.

However, the operating principle and procedure in the foregoing prior art is more complicated, and the probe and the cantilever both may cause electrostatic force on the measured test workpiece during the measurement process. Consequently, electric property measurement techniques, such as EFM and KFM, are required to add expensive additional equipment on the AFM, and the calculation of the measuring results is performed by complicated numerical analysis formula. In addition, the conventional technique further has a defect that it is incapable of directly quantitating components' electric field.

Therefore, precisely quantitating the characteristic of electrical components is an issue that needs to be overcome in the field. The charged probe stored with a fixed amount of charge having single, electric property and its method of measuring electric property according to the invention provides simple and fast manners to allow the probe to carry charge having only single electric property. Moreover, a fixed charge quantity having single electric property is measured by utilizing a simple correlation, such that the probe having charge quantity is applied in scanning probe microscope to quickly and simply measure electric field distribution and magnitude on the electrical components

SUMMARY OF THE INVENTION

Therefore, upon the foregoing problems of prior art, one of an objective of the present invention is to provide a probe applicable for scanning probe microscopy comprising an insulating tip base, a cantilever and a single nano-particle or a single micro-particle. A bottom of the insulating tip base has an erosion plane. The cantilever is connected to the insulating tip base and arranged for supporting the insulating tip base, and the single nano-particle or the single micro-particle may be disposed on the erosion plane.

Preferably, an adhesive layer is disposed between the single nano-particle or the single micro-particle and the erosion plane.

Preferably, a diameter of the single nano-particle may be 1 nanometer to 999 nanometers.

Preferably, a diameter of the single micro-particle may be 1 micrometer to 999 micrometers.

Preferably, the single nano-particle or the single micro-particle is made of an elect et material.

Preferably, the electret material be teflon, paraffin, ebonite, solid acid, barium titanate or calcium-titanate.

Preferably, the single nano-particle or the single micro-particle applied in scanning probe microscopy is stored with a fixed amount of charge having single electric property.

Another objective of the invention is to provide an electric field measurement method applicable for scanning probe microscopy. The electric field measurement method uses the foregoing probe. The electric field measurement method includes the following steps:

allowing the single nano-particle or the single micro-particle on the probe to store with a fixed amount of charge "q" having a single electric property through an electrode contact method to form the charged probe; allowing the single nano-particle or the single micro-particle on the probe to have a height distance "d" from an object to be measured; measuring an attraction force "F" at the height distance "d" between the single nano-particle or the single micro-particle and the object to be measured; calculating the fixed amount of charge "q" having single electric property through an equation of virtual image charge; arranging the charged probe stored with the fixed amount of charge having single electric property on an atomic force microscope after measuring the fixed amount of charge "q" having single electric property on the charged probe, and scan article images through tapping mode or capture an electric field distribution diagram of the object to be measured through a force-distance curve.

Preferably, the electrode contact method is to apply bias on the charged probe in order to make the single nano-particle or the single micro-particle of the charged probe store with the fixed amount of charge having single electric property.

Preferably, the equation of virtual image charge matches with a correlation: $F=q^2/[4\pi\epsilon 0(2d)^2]$, wherein $\epsilon 0$ is vacuum permittivity.

The charged probe and its electric field measurement method according to the invention have one or more advantages as the following:

1. The charged probe and its electric field measurement method according to the invention may overcome the problem of conventional EFM measurement resolution incapable of being precisely measured since the probe and the cantilever are conductors.

2. The charged probe and its electric field measurement method according to the invention carry the probe stored with the fixed amount of charge having single electric property to incorporate with the function of an atomic force microscope (AFM) machine. By performing scanning force change or phase change, its electric field distribution and electrostatic region are measured to analyze the in-process quality of electrical components. There is no need to additionally impose voltage on the probe and perform complicated operating process in prior art.

BRIEF DESCRIPTION OF THE DRAWINGS

The detailed structure, operating principle and effects of the present invention will now be described in details hereinafter with reference to the accompanying drawings that show various embodiments of the invention as follows.

FIG. 8 is a third schematic diagram of an electric field measurement method according to the invention.

DETAILED DESCRIPTION OF THE PREFERRED EMBODIMENTS

The technical content of the present invention will become apparent by the detailed description of the following embodiments and the illustration of related drawings as follows.

Figure 1:
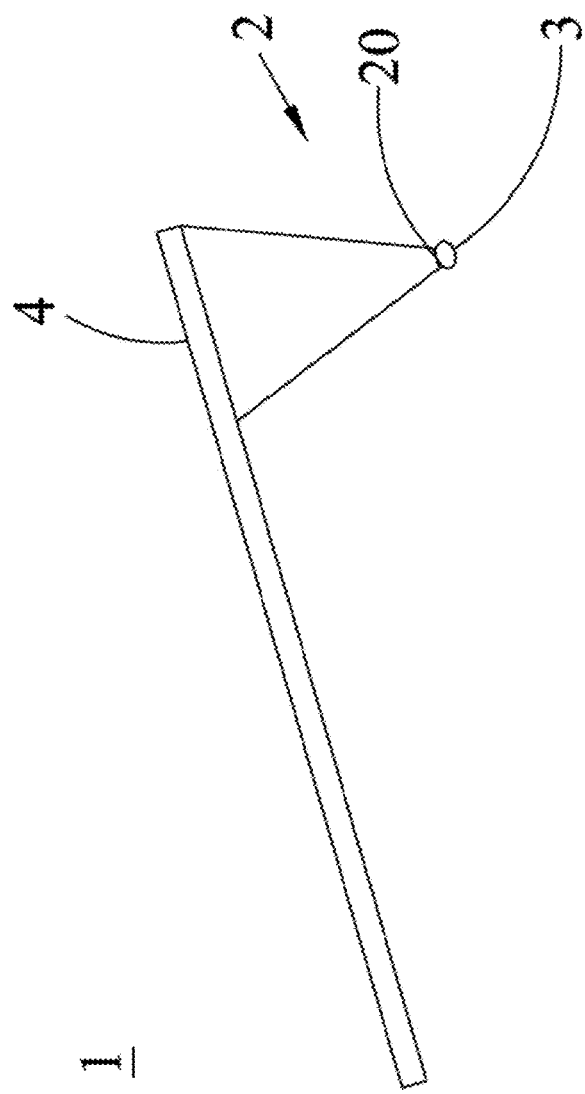
FIG. 1 is a first schematic diagram of a probe according to the invention.

With reference to FIG. 1 to FIG. 4, a first schematic diagram to a fourth schematic diagram of a probe according to the invention are depicted. As shown in FIG. 1, the probe 1 of the invention comprises an insulating tip base 2, a cantilever 4 and a single nano-particle 3. A bottom of the insulating tip base 2 has an erosion plane 20. The cantilever 4 is connected to the insulating tip base 2 and may be used for supporting the insulating tip base 2. The single nano-particle 3 may be disposed on the erosion plane 20. For example, the insulation material used in the insulating tip base 2 and the cantilever 4 may be silicon nitride. It should be noted that the embodiment according to the invention takes the single nano-particle 3 as demonstration aspect. A user may increase the diameter size of the single nano-particle 3 to the single micro-particle, wherein its diameter may be between 1 micron and 999 micron.

Figure 3:
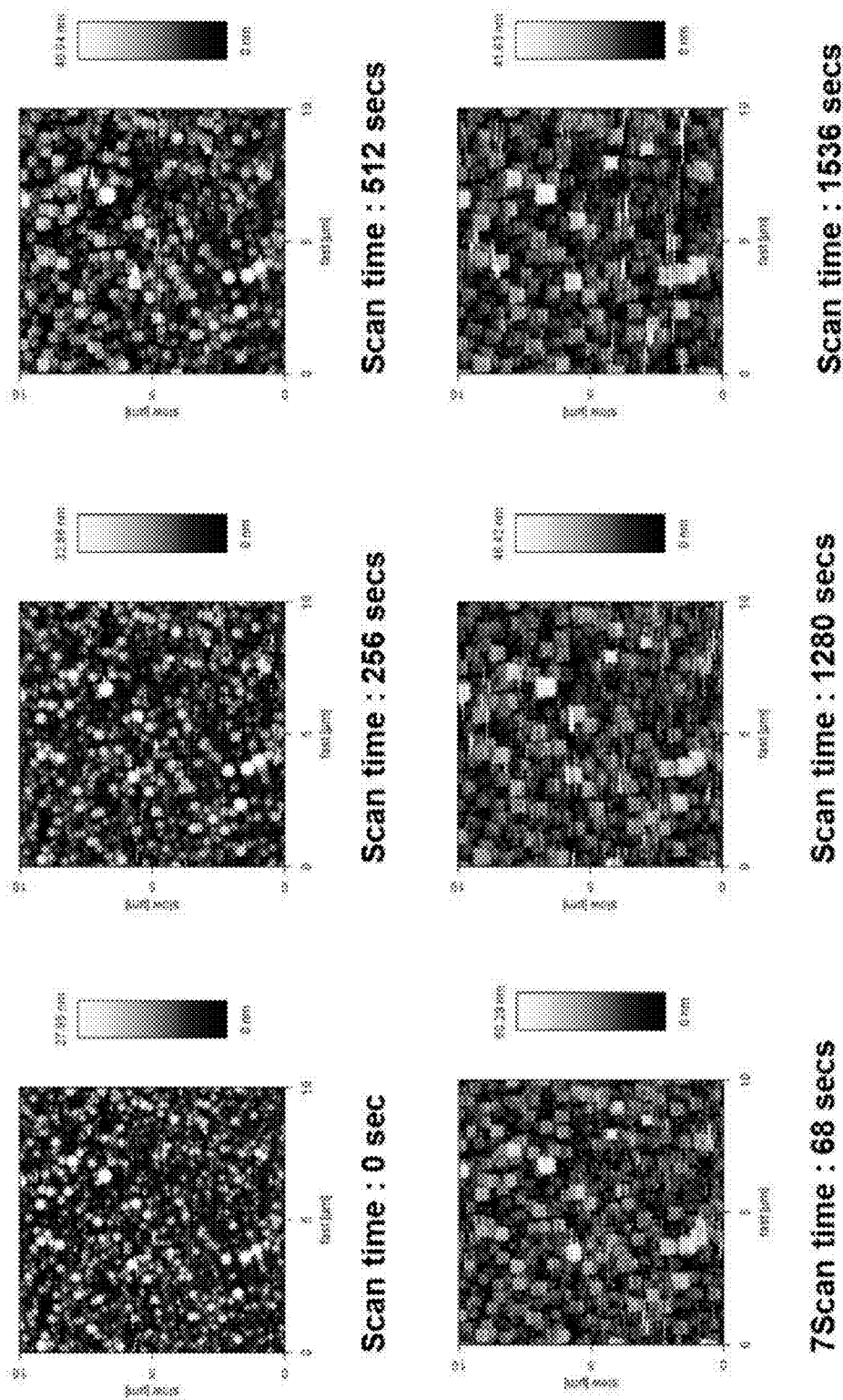
FIG. 3 is a third schematic diagram of a probe according to the invention.
Figure 4:
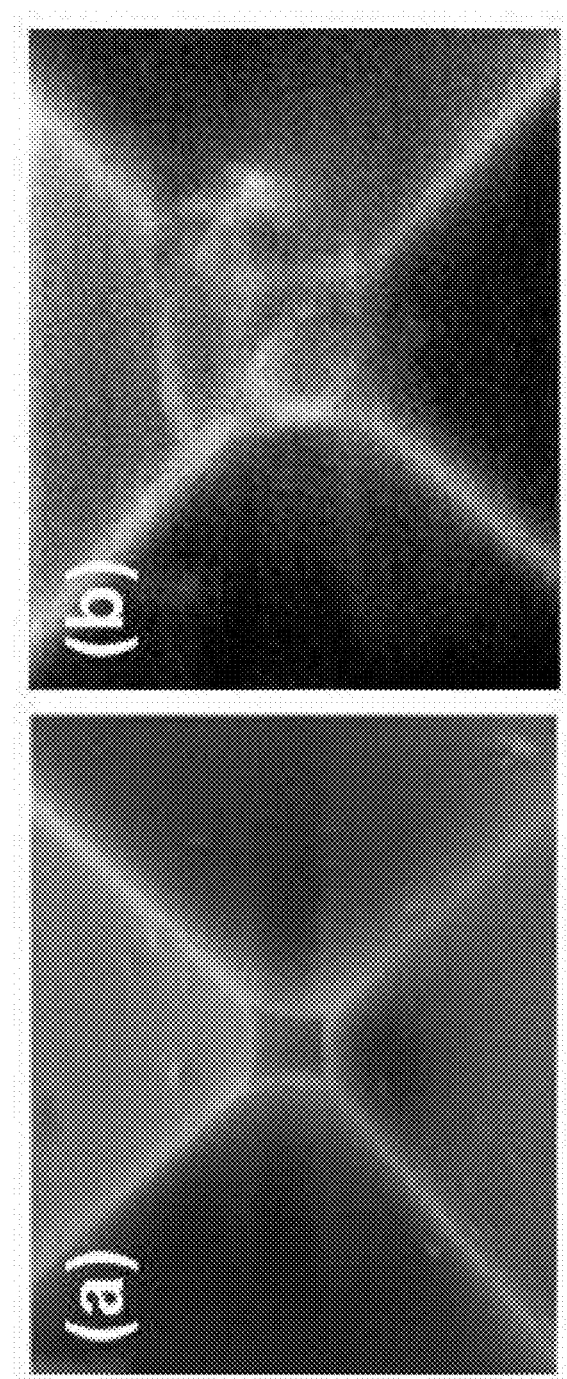
FIG. 4 is a fourth schematic diagram of a probe according to the invention.

In addition, the preparation of the erosion plane 20 of the insulating tip base 2 may be further abraded to produce the erosion plane 20 of the insulating tip base 2 by means of allowing the insulating tip base 2 to be in contact with at fixed force and moved on the surface of the wafer deposited with silicon nitride in parallel. At the same time, the erosion plane 20 of the insulating tip base 2 may be scanned by utilizing the AFM. When the scanned image (as shown in FIG. 3) displays that the erosion plane 20 of the insulating tip base 2 has a region (as shown in part(a) of FIG. 4) of a size required by the user, the single nano-particle 3 may be disposed on the erosion plane 20.

In other words, the user may decide the size of the erosion plane 20 according to the required size of the single nano-particle 3, so as to perform the most applicable condition. Preferably, the diameter of the single nano-particle may be between 1 nanometer and 999 nanometers. Preferably, the diameter of the single nano-particle may be between 50 nanometers and 500 nanometers. The single nano-particle is preferably made of electret material, wherein electret material may be Teflon, paraffin, ebonite, solid acid, barium titanate or calcium-titanate. In the invention, Teflon is, but not limited to, taken as the implementation aspect.

Figure 2:
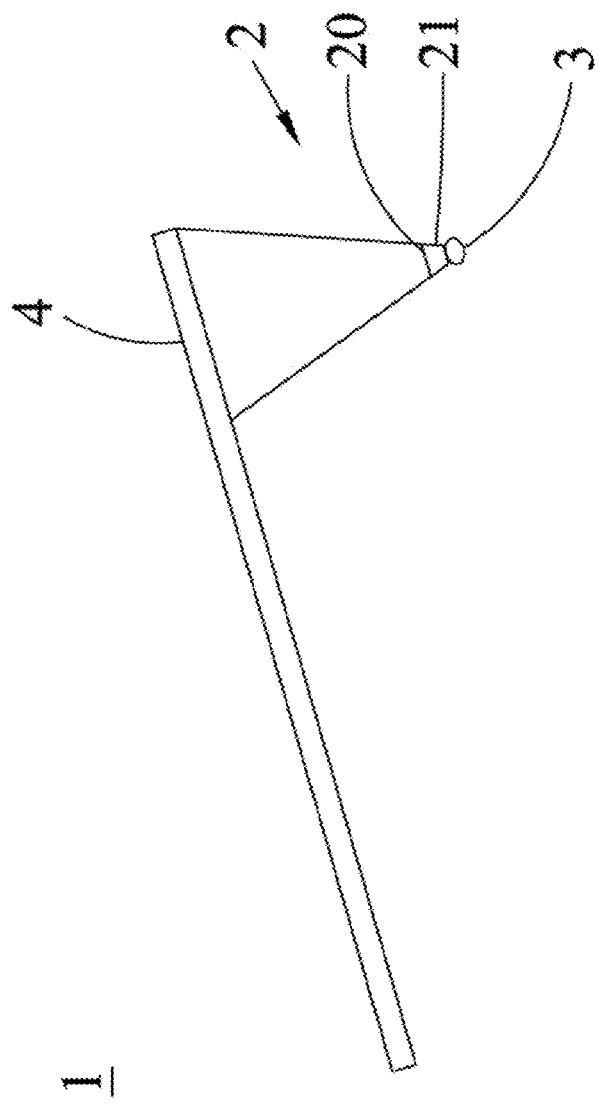
FIG. 2 is a second schematic diagram of a probe according to the invention.

With reference to FIG. 2, a second schematic diagram of a probe according to the invention is depicted. As shown in the figure, the structure and connection relationship of components having equivalent component symbols defined in FIG. 2 and FIG. 1 should be treated as the same, and there is no need to further depict. The difference between FIG. 2 and FIG. 1 is that FIG. 2 further includes an adhesive layer 21 disposed between the single nano-particle 3 and the erosion plane 20. It should be noted that the adhesive layer 21 may be formed by resin adhesives such as AB epoxy resin or UV glue.

For example, after the user picks up proper amount of resin adhesive through probe tips, the surface of a cleaned slide is backwardly and forwardly scratched, and the resin adhesive having several micron cubic volume may be found under the optical microscope. The erosion plane 20 of the probe 1 is slightly in contact with resin adhesive to bind proper resin adhesive on the erosion plane 20. Finally, Teflon single nano-particle 3 may be adhered to the erosion plane 20 (as shown in part(b) of FIG. 4) while the erosion plane 20 carrying proper resin adhesive is slightly touched with a test strip coated a layer of Teflon single nano-particle 3.

Figure 5:
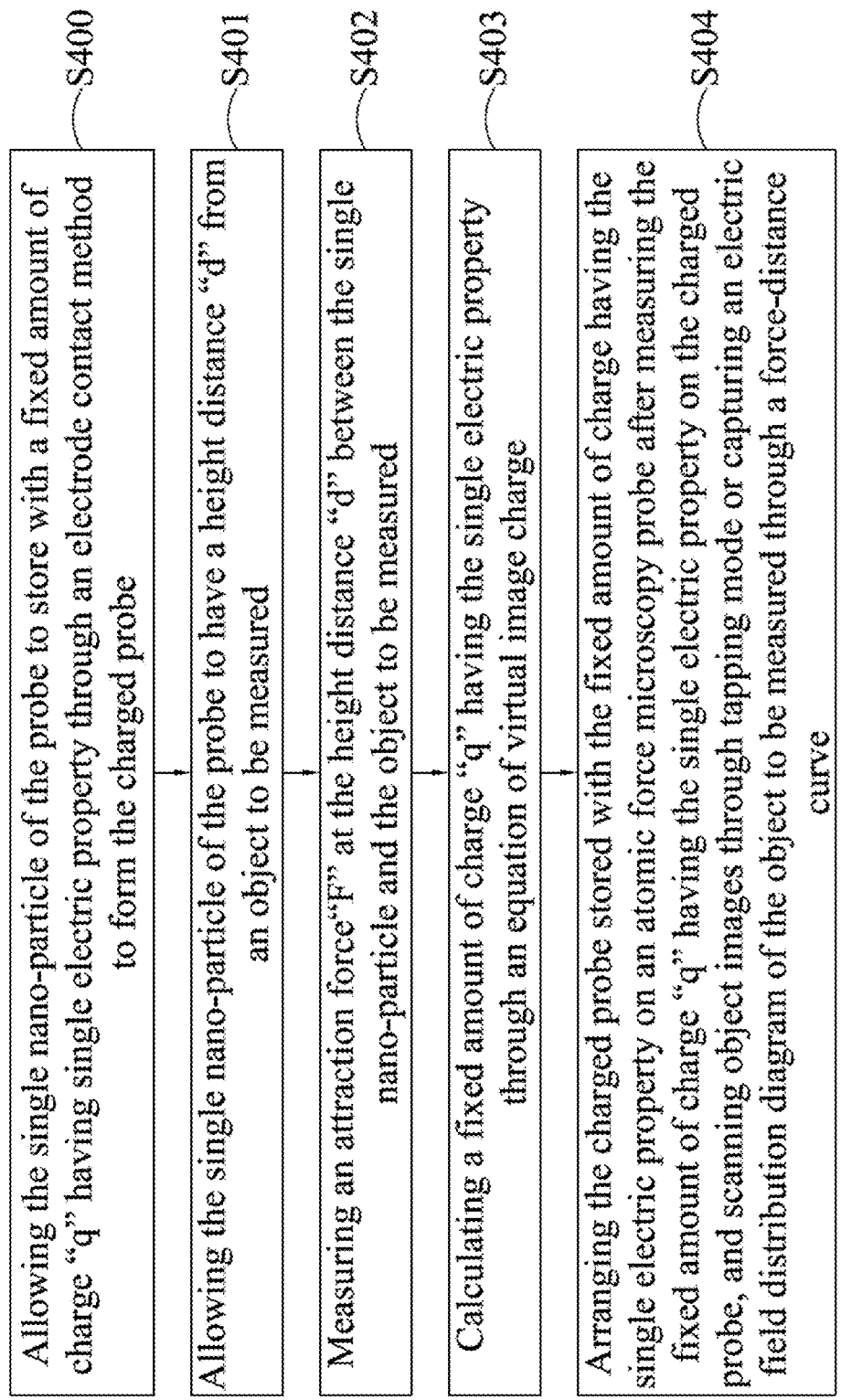
FIG. 5 is a flowchart of an electric field measurement method according to the invention.

With reference to FIG. 5, a flowchart of an electric field measurement method according to the invention is depicted. As shown in the figure, the electric field measurement method comprises the following steps:

S400: Allowing the single nano-particle of the probe to store with a fixed amount of charge "q" having single electric property through an electrode contact method to form the charged probe.

S401: Allowing the single nano-particle of the probe to have a height distance "d" from an object to be measured.

S402: Measuring an attraction force "F" at the height distance "d" between the single nano-particle and the object to be measured.

S403: Calculating a fixed amount of charge "q" having single electric property through an equation of virtual image charge.

S404: Arranging the charged probe stored with the fixed amount of charge having single electric property on an atomic force microscopy probe after measuring the fixed amount of charge "q" having single electric property on the charged probe, and scanning object images through tapping mode or capturing an electric field distribution diagram of the object to be measured through a force-distance curve.

Figure 6:
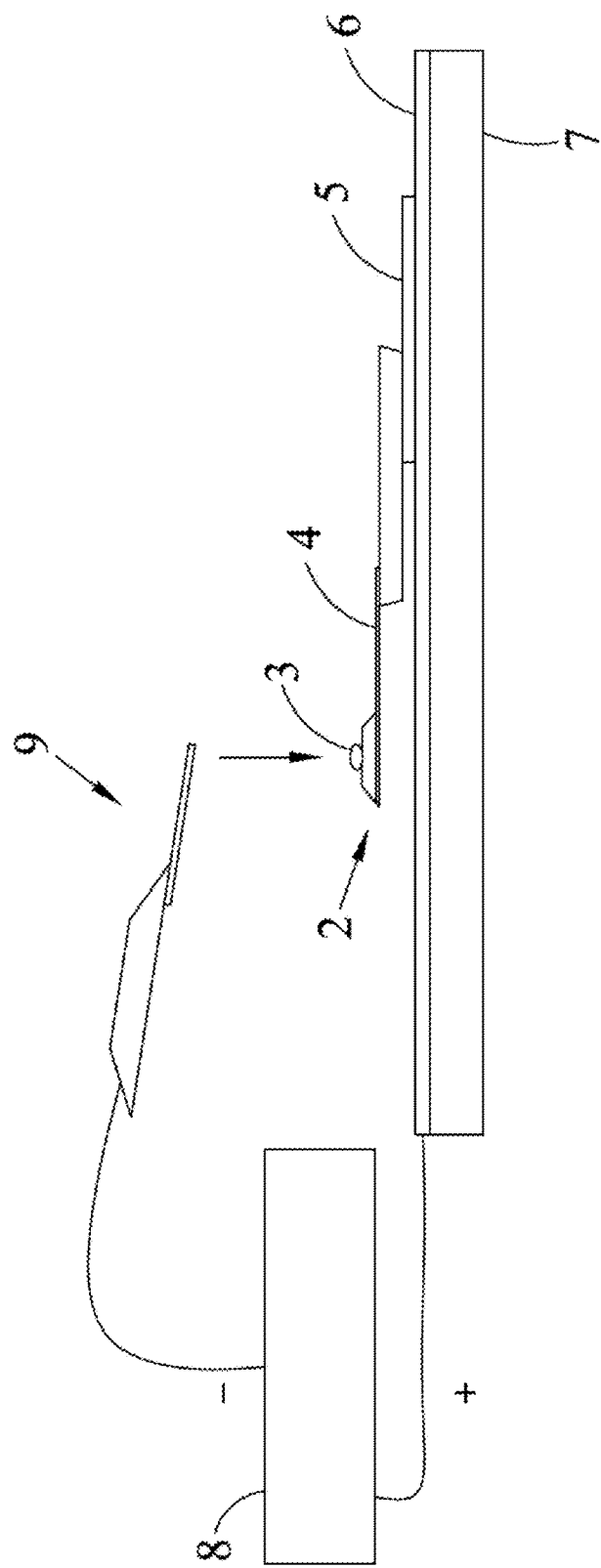
FIG. 6 is a first schematic diagram of an electric field measurement method according to the invention.

Bias may be imposed between probes 1 through the electrode contact method to allow the single nano-particle 3 on the probe 1 to store the fixed amount of charge having single electric property, thereby forming the charged probe. With reference to FIG. 6, a first schematic diagram of electric field measurement method according to the invention is depicted. As shown in the figure, the probe 1 according to the invention may be fastened to the metal layer 6 through metal glue 5 (i.e. copper glue), wherein the metal layer 6 may be fastened on the glass layer 7. The user may impose bias between the probes 1 through a power supply. More specifically, the positive voltage (+) of the power supply 8 is imposed on the metal layer 6 while the negative voltage (−) is imposed on a metal probe 9 at another side relative to the probe 1. When the metal probe 9 is downwardly and slightly touched with the single nano-particle 3 based upon the arrow direction shown in FIG. 5, the single nano-particle 3 may be charged to allow the single nano-particle to store with the fixed amount of charge having single electric property. It should be noted that when the metal probe 9 is slightly touched with the single nano-particle 3, 10-15 minutes may be selected as touch time to achieve better charging efficiency.

Figure 7:
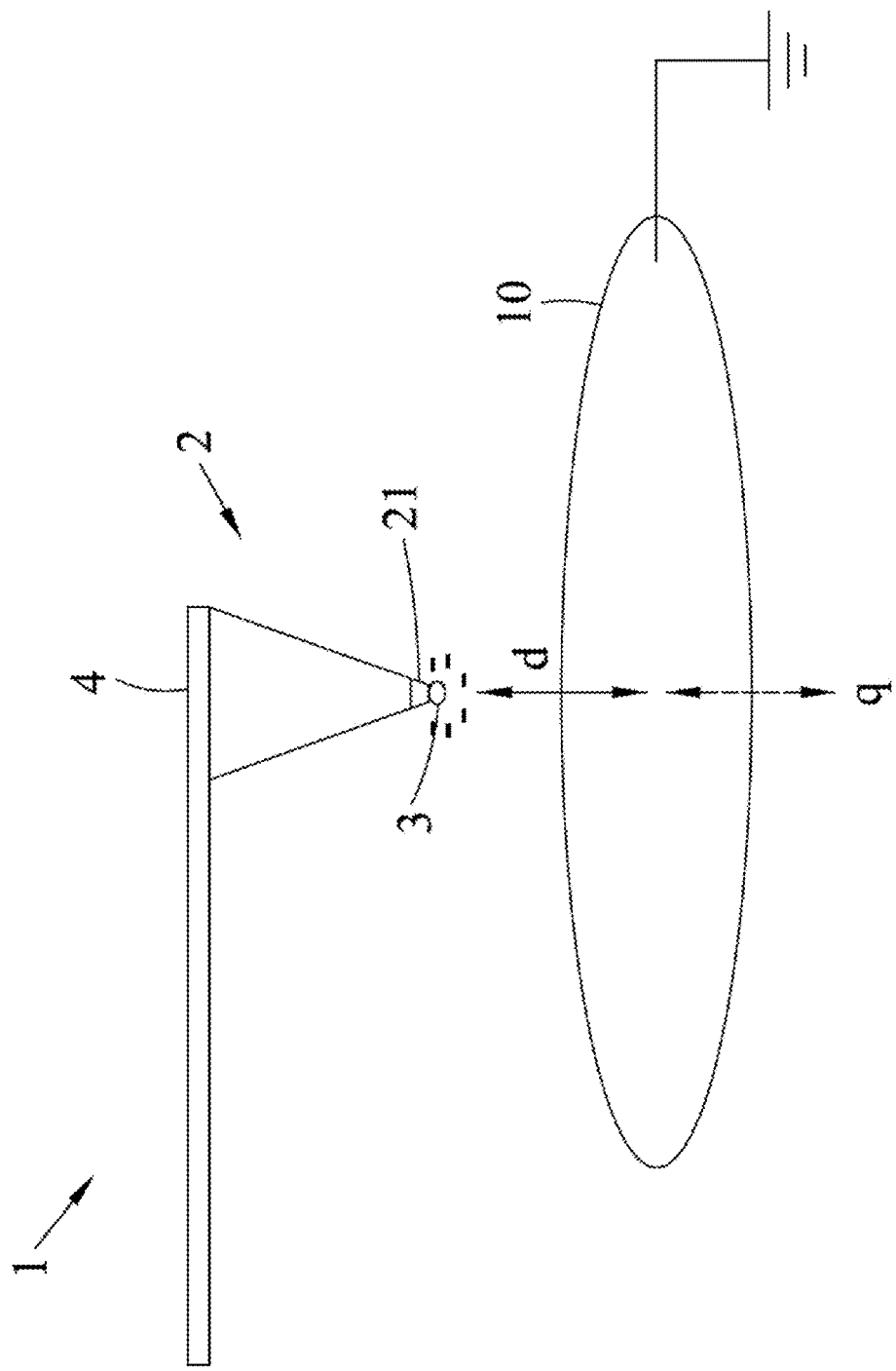
FIG. 7 is a second schematic diagram of an electric field measurement method according to the invention.

In addition, the fixed amount of charge q having single electric property may be obtained by the calculation of the equation of virtual image charge, and the equation of virtual image charge matches with a correlation $F=q^2/[4\pi\epsilon 0(2d)^2]$. With reference to FIG. 7, a second schematic diagram of an electrical field measurement method according to the invention is depicted. As shown in the figure, when the user measures the attraction force "F" at the height "d" between the single nano-particle 3 and the article to be measured 10, the correlation may be used to calculate the fixed amount of charge "q" having single electric property on the single nano-particle 3.

With reference to FIG. 8, after the charged probe is completed, the same type charge is stored on the electret small ball having single nanometer and loaded on the atomic microscope. The measurement is performed on the surface of the element through a tapping mode scanning method or a force-distance curve, so as to obtain the distribution of the electric field force on the surface of the element.

While the means of specific embodiments in the present invention has been described by reference drawings, numerous modifications and variations could be made thereto by those skilled in the art without departing from the scope and spirit of the invention set forth in the claims. The modifications and variations should be in a range limited by the specification of the present invention.

What is claimed is:

1. A charged probe applicable for scanning probe microscopy, comprising:
    an insulating tip base with its bottom having an erosion plane;
    a cantilever connected to the insulating tip base and arranged for supporting the insulating tip base; and
    a single nano-particle or a single micro-particle disposed on the erosion plane.

2. The charged probe of claim 1, wherein an adhesive layer is disposed between the single nano-particle or the single micro-particle and the erosion plane.

3. The charged probe of claim 1, wherein a diameter of the single nano-particle is about 1 nanometer to 999 nanometers.

4. The charged probe of claim 1, wherein a diameter of the single micro-particle is about 1 micrometer to 999 micrometers.

5. The charged probe of claim 1, wherein the single nano-particle or the single micro-particle is made of an electret material.

6. The charged probe of claim 5, wherein the electret material is teflon, paraffin, ebonite, solid acid, barium titanate or calcium-titanate.

7. The charged probe of claim 5, wherein the single nano-particle or the single micro-particle applied in scanning probe microscopy is stored with a fixed amount of charge having single electric property.

8. An electric field measurement method, applicable for scanning probe microscopy, using the charged probe of claim 1 comprising the steps of:
    allowing the single nano-particle or the single micro-particle of the probe to store with a fixed amount of charge "q" having a single electric property through an electrode contact method to form the charged probe;
    allowing the single nano-particle or the single micro-particle of the charged probe to have a height distance "d" from an object to be measured;
    measuring an attraction force "F" at the height distance "d" between the single nano-particle or the single micro-particle and the object to be measured;
    calculating the fixed amount of charge "q" having single electric property through an equation of virtual image charge; and
    arranging the charged probe stored with the fixed amount of charge having single electric property on an atomic force microscopy after measuring the fixed amount of charge "q" having single electric property on the charged probe, and scanning the object images through tapping mode or capturing an electric field distribution diagram of the object to be measured through a force-distance curve.

9. The electric field measurement method of claim 8, wherein the electrode contact method is to apply bias on the charged probe, such that the single nano-particle or the single micro-particle of the charged probe is stored with the fixed amount of charge having single electric property.

10. The electric field measurement method of claim 8, wherein an equation of virtual image charge matches with a correlation: $F=q^2/[4\pi\epsilon 0(2d)^2]$, wherein $\epsilon 0$ is vacuum permittivity.

* * * * *